Patented Sept. 2, 1941

2,255,027

UNITED STATES PATENT OFFICE 2,255,027

FERTILIZER MANUFACTURE

Frank G. Keenen, Swarthmore, Pa., and Ward H. Sachs, Orlando, Fla., assignors to E. I. du Pont de Nemours & Company, Wilmington, Del., a corporation of Delaware No Drawing. Application January 24, 1941, Serial No. 375,802

11 Claims. (Cl. 71—27)

This invention relates to fertilizers and more particularly to the production of improved nitrogen-carrying fertilizer materials. This application is a continuation-in-part of Serial No. 283,060, filed July 6, 1939.

It is well known that nitrogen is one of the elements required for satisfactory plant growth and that the presence of nitrogen is, therefore, necessary in a complete fertilizer mixture. Accordingly, various methods have previously been proposed for adding nitrogen to fertilizer materials such as, for example, the use of organic- and inorganic-nitrogen-carrying liquors. Thus, ammoniacal solutions of urea, of ammonium nitrate or sodium nitrate, and the like have been added to acidic fertilizer materials, such as superphosphate, for the purpose of increasing the nitrogen content of the acidic fertilizer material. The resulting fertilizer mixtures contain water soluble nitrogen which is immediately available to plants, but, because of its water solubility characteristics, a substantial portion of this nitrogen may be removed from the soil before absorption by growing vegetation.

It is an object of the present invention to overcome the disadvantages of the prior art and to provide a new and improved process for the addition to acidic fertilizer materials of available nitrogen in a form which is not readily soluble in water.

It is a further object of this invention to provide a new and improved nitrifying liquid of a form such that, when the nitrifying liquid is added to acidic fertilizer materials containing a urea, a portion of its nitrogen becomes available to plants gradually and over a relatively extended period of time.

It is an additional object of this invention to provide a new and improved process for the simultaneous or one-step addition to acidic fertilizer materials of nitrate and ammoniacal nitrogen, in addition to nitrogen which is not readily soluble in water.

Other objects and advantages of this invention will be apparent from the following specification in which its preferred details and embodiments are described.

The improved nitrifying agent of this invention comprises a solution obtainable by mixing formaldehyde, ammonia, water and a nitrate such as ammonium, calcium, potassium or sodium nitrate, which solution upon addition to acidic fertilizer materials containing urea produces a nitrogenous fertilizer containing water soluble ammoniacal and nitrate nitrogen as well as a substantial amount of relatively water-insoluble organic nitrogen. If desired, a urea may also be added to the nitrifying solution of this invention rather than or in addition to the urea in the acidic fertilizer materials, replacing wholly or in part the urea otherwise present in the acidic fertilizer materials to be treated.

By formaldehyde, it is meant to include any of its forms such as its solid polymers or gaseous or aqueous solutions thereof. The terms "urea" or "a urea" as used herein refer to urea and thiourea and derivatives of urea and thiourea such as the monoalkyl and monoacyl ureas and thioureas, or the urethanes and thiourethanes. These terms also include guanidine and such derivatives as the alkylated or acylated guanidine. Typical examples of compounds coming within the scope of the above definition are urea, thiourea, methyl and ethyl urea, methyl and ethyl thiourea, acetyl urea, guanidine, urethane, biuret and the like.

It should be understood, of course, that simultaneous addition of ammoniacal, nitrate, and relatively insoluble nitrogen is accomplished by addition to acidic fertilizer materials of our preferred nitrifying agent which is obtained by mixing formaldehyde, a nitrate, urea, water and ammonia. And it should likewise be understood that, alternatively, the production of fertilizers containing water-soluble ammoniacal and nitrate nitrogen as well as a substantial amount of relatively water-insoluble organic nitrogen, may be obtained by the addition to acidic fertilizer materials containing a urea of a nitrifying liquid obtained by mixing formaldehyde, ammonia, water and a nitrate. Consequently, where reference is made, hereinafter, to proportions of urea, formaldehyde and ammonia, it will be understood that such proportions apply whether the urea is originally in the nitrifying solution or in the acidic fertilizer to be treated.

Thus, according to a preferred form of this invention, formaldehyde may be added to a solution containing a nitrate such as ammonium nitrate and urea in such proportions, preferably, that there is present in the resultant solution at least one mol of urea per mol of formaldehyde and preferably not over 5 mols of urea per mol of formaldehyde, in all cases there being preferably at least one half mol of ammonia per mol of formaldehyde. More than 5 mols of urea per mol of formaldehyde in the nitrifying solution, altho operative, tends to retard formation of water-insoluble nitrogen, which otherwise forms readily, when the nitrifying solution is added to acidic fertilizer materials.

The nitrifying solution as previously pointed out can, in turn, be added to acidic fertilizer materials such as superphosphate, triple superphosphate, or a mixed fertilizer containing such phosphates to provide a complete fertilizer containing both water soluble and relatively water-insoluble nitrogen, the soluble ammoniacal and nitrate nitrogen portion being immediately available to plants and the relatively insoluble form of nitrogen being available to plants throughout their growing period.

The nitrifying solutions of this invention may be prepared by mixing the constituents as desired, such as in our preferred solution, for example, by adding formaldehyde to ammoniacal ammonium nitrate solutions of the urea, or alternatively, by adding the urea to the mixture of formaldehyde, ammonium nitrate and ammonia, or by adding the formaldehyde to the urea and the resultant mixture then being added to or mixed with ammoniacal solutions of ammonium nitrate. Inasmuch as the addition of formaldehyde to ammoniacal solutions necessarily results in the formation of hexamethylene tetramine, it will be understood that hexamethylene tetramine may be substituted for formaldehyde in the foregoing description. Furthermore, since formaldehyde and urea may form methylol ureas prior to their admixture with ammonia, it will be understood that methylol ureas may also be substituted for formaldehyde and urea in the above description.

Important economies can also be obtained in conjunction with the manufacture of urea, according to this invention, similarly to those set forth in U. S. 1,894,136. Thus, the urea synthesis melt obtained by pressure reaction of ammonia and carbon dioxide, or compounds containing them, need not be treated for removal of unreacted constituents and may be directly adjusted by addition of formaldehyde and ammonium nitrate thereto to yield a desirable nitrogen-carrying liquid containing the desired ratios of fixed to free ammonia as well as being characterized by the ability to produce the desired quantities of water-insoluble but plant-available nitrogen when added to acidic fertilizer materials.

The nitrifying liquors of this invention may be added before, during, or after addition of other materials in preparing a fertilizer. Thus, when it is desired to add nitrogen in a liquid composition to a fertilizer material, the solution of this invention may be added to or substituted for ammoniating solutions generally, such, for example, as the ammoniating or nitrifying solutions described in U. S. Patent 1,894,136, which contain both inorganic and organic nitrogen. Again, proceeding according to this invention, the nitrifying liquors of this invention may be added to acidic or phosphatic fertilizer material either before, after, or during admixture of additional materials, for example, potash salts, such as potassium sulfate, chloride, and nitrate; ammonium salts such as ammonium chloride, nitrate, sulfate, carbamate, ammonium- and diammonium phosphates, or the like, and then the product obtained may be further ammoniated by use of commercial aqua or anhydrous ammonia. Or, as an alternative, the acidic fertilizer materials may be first ammoniated, somewhat at least by use of ammonia as above described, and thereafter further nitrogen added to the ammoniated product by the addition to such ammoniated product of the nitrifying liquids of the present invention; or the nitrifying liquid may be added during such ammoniation with ammonia or nitrogen-containing material while, at the same time, after or before, other materials such as previously mentioned may be added to obtain a finished fertilizer.

We have, for example, found that desirable finished fertilizers may be produced by spraying or otherwise mixing the nitrifying liquid of the present invention with acidic fertilizer materials and thereafter mixing the resulting product with additional fertilizer materials such as potash salts and the like or other materials such as previously described. The proportions of nitrifying liquid ingredients and of the liquid itself to acidic fertilizer materials may vary over a wide range, dependent upon the content of soluble ammoniacal, nitrate and water insoluble nitrogen which it is desired to have in the final product.

In utilizing the nitrifying solutions of this invention, which by themselves add various forms of nitrogen to acidic fertilizer materials, it will be apparent that many advantages are present. Containing, as such solutions do, nitrogen in a highly concentrated form, they permit the introduction in a single operation in liquid form of four sources of nitrogenous plant food into a fertilizer base, i. e., water soluble organic and inorganic and ammoniacal nitrogen as well as nitrogen-containing products of low water solubility. Since the relative proportions of aldehyde and substituted ammonia, e. g. a urea, may be varied, and since other nitrogen compounds may be added to the nitrifying solutions of this invention, such, for example, as various proportions and mixtures of sodium, calcium and ammonium nitrate, ammonium sulfate, and the like, a great flexibility of operation in the liquid phase is at the hand of the operator.

The following examples will illustrate the practice of this invention, although the invention is not limited to the examples.

Example I

To 31.4 parts of a 62.4% urea solution are added 12.1 parts of an 81% formaldehyde solution and 56.5 parts of a mixture containing 42.4 parts $NH_4NO_3$ and 14.1 parts anhydrous $NH_3$. The resulting solution containing 43.2% ammonia, when used to treat acidic phosphatic fertilizers, will yield approximately ¼ of its nitrogen in the form of insoluble organic nitrogenous compounds, ⅕ as nitrate nitrogen and the remainder as ammoniacal nitrogen.

Example II

To 80 parts of a mixture of 60 $NH_4NO_3$ and 20 anhydrous ammonia is added 33.9 parts of a 41% formaldehyde solution. When 303 parts of this solution containing 40% total ammonia are mixed with 1625 parts of superphosphate containing 74 parts urea, there is obtained a base carrying 6.7% total nitrogen and 16% available $P_2O_5$, wherein approximately ¼ of the nitrogen is water insoluble, ⅕ is in the nitrate form and the remainder is ammoniacal nitrogen.

Example III

To 80 parts of a mixture containing 60 $NH_4NO_3$ and 20 anhydrous ammonia are added 61.7 parts of a 67.6% monomethylol urea solution. The resultant solution containing 43.2% total ammonia, when added to superphosphate, yields ¼ of its nitrogen as water insoluble, ⅕ as nitrate and the remainder in the ammoniacal form.

Example IV

To a solution of 54 parts $NH_4NO_3$ and 18 parts of anhydrous ammonia, there are added 28 parts of a 35.7% hexamethylene tetramine solution. When 300 parts of the resulting liquor containing 45.8% total ammonia is added to a mixture of 1623 parts superphosphate containing 77 parts of urea, there is obtained a base carrying 16% available $P_2O_5$ and 7.4% total nitrogen, wherein approximately ¼ of the nitrogen is water insoluble, ¼ as nitrate, and the remainder as ammoniacal.

The nitrifying solution may be added to the other ingredients of the complete fertilizer mixture in various ways, such as by spraying the nitrifying solution into the mixing vessel while agitating the other ingredients.

In the manufacture of fertilizers according to this invention it has been found not only that the advantages heretofore referred to are obtained, but also that, as compared with processes involving the separate addition of the same ingredients, a lower maximum temperature on ammoniation and a lower hygroscopicity of the product result. The lower temperature of ammoniation is important in that the reversion of available $P_2O_5$ as well as decomposition of urea in storage is considerably reduced. The lower hygroscopicity is of obvious importance in the storage, handling, and distribution of the fertilizers.

The proportions of ammonia, water, ammonium nitrate, urea and formaldehyde in our solutions may vary over a wide range, depending upon the amounts of free, nitrate, and insoluble nitrogen it is desired to have in the finished fertilizer. The water content should be, preferably, sufficient to avoid crystallization of the solution at ordinary temperatures encountered in fertilizer handling. The free ammonia content may vary widely but preferably should be such as to comprise from about 25 to 75% of the total nitrogen. The nitrate nitrogen, as represented by ammonium nitrate content of the solution, although susceptible of a wide range in proportions, should be preferably from 10% to 30% of the total nitrogen. The soluble organic nitrogen content, as represented by urea, may vary over a wide range, such as from none at all up to 40% of the total nitrogen content for example.

The formaldehyde content should be guided by the quantity of insoluble nitrogen desired, and, in turn, is dependent upon the urea content of the solution. As pointed out previously, for each mol of urea there should be, preferably, at least one mol of formaldehyde although there may be as much as 5 mols of urea per mol of formaldehyde. Generally speaking, however, the insoluble nitrogen should comprise from 10 to 30% of the total nitrogen and there should be sufficient formaldehyde to react with a quantity of urea which will give an insoluble nitrogen content of from 10 to 30% of the total nitrogen.

The quantities of nitrifying solution added to acidic fertilizer materials, such as superphosphate, may vary over a wide range, depending upon the degree of ammoniation desired. Preferably, however, we add sufficient nitrifying solution so that there will be added from 20 to 40 pounds of free ammonia to each 1000 pounds of superphosphate.

Various changes may be made in the compositions hereinbefore described as well as in the method for preparing and embodying the same without departing from the invention or sacrificing any of the advantages thereof.

We claim:

1. A fertilizer nitrifying solution prepared for use in ammoniating acidic fertilizer materials containing a urea comprising the product obtainable by mixing formaldehyde, ammonium nitrate, water and ammonia.

2. A fertilizer nitrifying solution prepared for use in ammoniating acidic fertilizer materials comprising the product obtainable by mixing formaldehyde, a urea, ammonium nitrate, water and ammonia.

3. A fertilizer nitrifying solution prepared for use in ammoniating acidic fertilizer materials comprising the product obtainable by mixing formaldehyde, ammonium nitrate, water and ammonia, which solution, upon addition to acidic fertilizer materials containing urea, will form an organic nitrogen-containing product of low water solubility.

4. A fertilizer nitrifying solution prepared for use in ammoniating acidic fertilizer materials comprising the product obtainable by mixing formaldehyde, a urea, ammonium nitrate, water and ammonia, and which solution, upon addition to acidic fertilizer materials, forms an organic nitrogen-containing product of low water solubility.

5. A fertilizer nitrifying solution prepared for use in ammoniating acidic fertilizer materials comprising the product obtainable by mixing water, ammonia, formaldehyde, ammonium nitrate, and a urea in the ratios in the range of from 1 mol of urea per mol of formaldehyde to 5 mols of urea per mol of formaldehyde.

6. A process for the production of a fertilizer which comprises incorporating with an acidic fertilizer material a nitrifying solution obtainable by mixing formaldehyde, a urea, ammonium nitrate, free ammonia and water.

7. A fertilizer composition comprising the product obtained by mixing with acidic fertilizer materials a nitrifying solution prepared by mixing formaldehyde, ammonium nitrate, water and ammonia.

8. A fertilizer composition comprising the product obtained by mixing with acidic fertilizer materials a nitrifying solution prepared by mixing formaldehyde, a urea, ammonium nitrate, water and ammonia.

9. A fertilizer composition comprising the product obtained by mixing with acidic fertilizer materials a nitrifying solution prepared by mixing water, ammonia, formaldehyde, ammonium nitrate and a urea in the ratios of from 1 mol of urea per mol of formaldehyde to 5 mols of urea per mol of formaldehyde.

10. A fertilizer composition comprising the product obtained by mixing with acidic fertilizer materials a nitrifying solution prepared by mixing water, ammonia, formaldehyde, ammonium nitrate and a urea in the ratios of from 1 mol of urea per mol of formaldehyde to 5 mols of urea per mol of formaldehyde and there being at least one-half mol of ammonia per mol of formaldehyde.

11. A fertilizer composition comprising the product obtained by mixing with superphosphate a nitrifying solution prepared by mixing water, ammonia, formaldehyde, ammonium nitrate and a urea in the ratios of from 1 mol of urea per mol of formaldehyde to 5 mols of urea per mol of formaldehyde, there being at least one-half mol of ammonia per mol of formaldehyde, and the nitrifying solution being added in amount sufficient to give 20 to 40 pounds of free ammonia per 1000 pounds of superphosphate.

FRANK G. KEENEN.
WARD H. SACHS.